(12) United States Patent
Carpentier et al.

(10) Patent No.: US 12,019,293 B2
(45) Date of Patent: *Jun. 25, 2024

(54) PHOTONIC SYSTEM AND METHOD FOR ITS MANUFACTURE

(71) Applicant: STMicroelectronics (Crolles 2) SAS, Crolles (FR)

(72) Inventors: Jean-Francois Carpentier, Meylan (FR); Charles Baudot, Lumbin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,623

(22) Filed: Sep. 15, 2022

(65) Prior Publication Data
US 2023/0015854 A1 Jan. 19, 2023

Related U.S. Application Data

(63) Continuation of application No. 16/748,696, filed on Jan. 21, 2020, now Pat. No. 11,474,317.

(30) Foreign Application Priority Data

Jan. 22, 2019 (FR) ...................................... 1900532

(51) Int. Cl.
*G02B 6/43* (2006.01)
*G02B 6/12* (2006.01)
(Continued)

(52) U.S. Cl.
CPC ........... *G02B 6/43* (2013.01); *G02B 6/12004* (2013.01); *G02B 6/13* (2013.01); *G02B 6/4234* (2013.01); *G02B 2006/12061* (2013.01)

(58) Field of Classification Search
CPC .................................................... G02B 6/4234
See application file for complete search history.

(56) References Cited

U.S. PATENT DOCUMENTS

| 6,118,075 A | 9/2000 | Baker et al. |
| 6,888,989 B1 | 5/2005 | Zhou et al. |

(Continued)

FOREIGN PATENT DOCUMENTS

| CN | 107111056 A | 8/2017 |
| CN | 107210813 A | 9/2017 |

(Continued)

*Primary Examiner* — Eric Wong
(74) *Attorney, Agent, or Firm* — Seed IP Law Group LLP

(57) ABSTRACT

A photonic system includes a first photonic circuit having a first face and a second photonic circuit having a second face. The first photonic circuit comprises first wave guides, and, for each first wave guide, a second wave guide covering the first wave guide, the second wave guides being in contact with the first face and placed between the first face and the second face, the first wave guides being located on the side of the first face opposite the second wave guides. The second photonic circuit comprises, for each second wave guide, a third wave guide covering the second wave guide. The first photonic circuit comprises first positioning devices projecting from the first face and the second photonic circuit comprises second positioning devices projecting from the second face, at least one of the first positioning devices abutting one of the second positioning devices in a first direction.

17 Claims, 5 Drawing Sheets

(51) Int. Cl.
    *G02B 6/13*     (2006.01)
    *G02B 6/42*     (2006.01)

(56) References Cited

U.S. PATENT DOCUMENTS

| | | |
|---|---|---|
| 7,131,658 B2 | 11/2006 | MacKarvich |
| 8,483,253 B2 | 7/2013 | Budd et al. |
| 10,564,354 B2 * | 2/2020 | Fortusini ................ G02B 6/125 |
| 10,620,377 B1 | 4/2020 | Burckel et al. |
| 2001/0055447 A1 | 12/2001 | Delprat et al. |
| 2006/0208455 A1 | 9/2006 | MacKarvich |
| 2013/0084039 A1 | 4/2013 | Doany et al. |
| 2013/0156366 A1 | 6/2013 | Raj et al. |
| 2014/0001617 A1 | 1/2014 | Shi et al. |
| 2014/0334781 A1 * | 11/2014 | Fiorentino ........... G02B 6/3855 |
| | | 29/428 |
| 2016/0231521 A1 | 8/2016 | Smith et al. |
| 2016/0274318 A1 | 9/2016 | Vallance et al. |
| 2016/0327742 A1 * | 11/2016 | Collins ................ G02B 6/1228 |
| 2017/0244216 A1 * | 8/2017 | Hemenway ............. H01S 5/023 |
| 2017/0360018 A1 | 12/2017 | Owens et al. |
| 2018/0275342 A1 * | 9/2018 | Shaw ................... G02B 6/2821 |
| 2018/0364431 A1 | 12/2018 | Zhao |
| 2020/0132934 A1 | 4/2020 | Sutherland |
| 2020/0292766 A1 | 9/2020 | Vermeulen et al. |
| 2021/0285212 A1 | 9/2021 | Zhang |

FOREIGN PATENT DOCUMENTS

| | | |
|---|---|---|
| JP | 2008046662 A | 2/2008 |
| WO | WO 2015038941 A1 | 3/2015 |

\* cited by examiner

PHOTONIC SYSTEM AND METHOD FOR ITS MANUFACTURE

BACKGROUND

Technical Field

The present disclosure generally relates to photonic systems, also called optoelectronic systems, in particular photonic systems comprising light sources, and methods for their manufacture.

Description of the Related Art

Photonic systems are systems that permit the generation, transmission, processing (for example modulation and amplification) or conversion of optical signals. In particular, there are photonic systems that render possible the exchange of signals between a plurality of chips of integrated circuits.

Generally, optical signals of photonic systems are generated by a light source, for example a laser source. The laser source generally corresponds to a photonic circuit for emitting an optical signal distinct from the other photonic circuits that realize the transmission, processing and conversion of the optical signals, and called photonic processing circuits in the following. An optical coupling is realized between the photonic emitter circuit and a photonic processing circuit. There are different techniques for optical coupling that present different performances with regard to optical losses, congestion or tolerance to misalignment.

For certain applications, it is desirable for a photonic system to comprise a plurality of sources of optical signals that operate, for example, in parallel on a same photonic emitter circuit.

BRIEF SUMMARY

There is a need to realize an optical coupling between an emitter circuit comprising more than one optical signal source and another photonic circuit.

One embodiment addresses all or some of the drawbacks of known photonic systems.

One embodiment provides a photonic system comprising a first photonic circuit having a first face and a second photonic circuit having a second face, at least partly facing the first face, the first photonic circuit comprising first wave guides, and, for each first wave guide, a second wave guide at least partly covering the first wave guide, the second wave guides being in contact with the first face and deposited between the first face and the second face, the first wave guides being located on the side of the first face opposite the second wave guides, an adiabatic coupling being realized between each second wave guide and the first wave guide covered by said second wave guide, the second photonic circuit comprising, for each second wave guide, a third wave guide at least partly covering the second wave guide, an adiabatic coupling being realized between each third wave guide and the second wave guide covered by the third wave guide, the first photonic circuit comprising first positioning devices projecting from the first face and the second photonic circuit comprising second positioning devices projecting from the second face, at least one of the first positioning devices abutting one of the second positioning devices in a first direction.

According to an embodiment, each first positioning device comprises a first surface that projects from the first face in a second direction perpendicular to the first direction. Each second positioning device comprises a second surface that projects from the second face in the second direction, and for said first positioning device in mechanical contact with one of the second positioning devices, the first surface of said first positioning device is in contact with the second surface of said second positioning device.

According to an embodiment, each first positioning device comprises a first body and a portion that protrudes in relation to the first body in the first direction and each second positioning device comprises a second body and a hollow portion that sections the second body in the first direction.

According to an embodiment, the protruding portion has a shape at least partly complementary to the hollow portion.

According to an embodiment, the protruding portion has a cross-section in the first direction the area of which decreases as the distance from the first body increases.

According to an embodiment, the second wave guides and the first positioning devices are made of the same material.

According to an embodiment, each first positioning device is in mechanical contact with one of the second positioning devices.

According to an embodiment, the first photonic circuit comprises as many light sources as first wave guides.

According to an embodiment, the light sources are laser sources.

According to an embodiment, the system further comprises a support, the second photonic circuit being fixed to the support and the first photonic circuit being fixed to the support by way of at least one bonding ball.

An embodiment also provides a method for manufacturing a photonic system comprising a first photonic circuit having a first face and a second photonic circuit having a second face, the first photonic circuit comprising first wave guides, and, for each first wave guide, a second wave guide at least partly covering the first wave guide, the second wave guides being in contact with the first face, the first wave guides being located on the side of the first face opposite the second wave guides, an adiabatic coupling being realized between each second wave guide and the first wave guide covered by said second wave guide, the second photonic circuit comprising, for each second wave guide, a third wave guide, the first photonic circuit comprising first positioning devices projecting from the first face and the second photonic circuit comprising second positioning devices projecting from the second face, the method comprising the following steps:—positioning the second face at least partly facing the first face; and—moving the first photonic circuit with respect to the second photonic circuit in a first direction until at least one of the first positioning devices abuts one of the second positioning devices, each third wave guide thus at least partly covering one of the second wave guides, an adiabatic coupling being realized between the third wave guide and the second wave guide covered by the third wave guide.

According to an embodiment, during the movement, said first positioning device cooperates mechanically with said second positioning device so as to move the first photonic circuit with respect to the second photonic circuit in a third direction that is inclined with respect to the first and second directions.

According to an embodiment, the photonic system further comprises a support, the second photonic circuit being fixed to the support, the method comprising the fixation of the first photonic circuit to the support by way of at least one bonding ball.

According to an embodiment, the method successively comprises moving said at least one of the first positioning devices so as to abut said one of the second positioning devices while the bonding ball is in a solid state, at least partially melting the bonding ball and the bringing the first and second faces closer together.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may have identical structural, dimensional and material properties.

For the sake of clarity, only the operations and elements that are useful for an understanding of the embodiments described herein have been illustrated and described in detail.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to a photonic circuit as orientated during normal use.

Unless specified otherwise, the expressions "around", "approximately", "substantially" and "in the order of" signify within 10%, and preferably within 5%. Any reference to a refractive index of a material of a photonic circuit is understood to mean a wavelength refraction index of the optical signal used during the normal operation of the photonic circuit.

Figure 1:
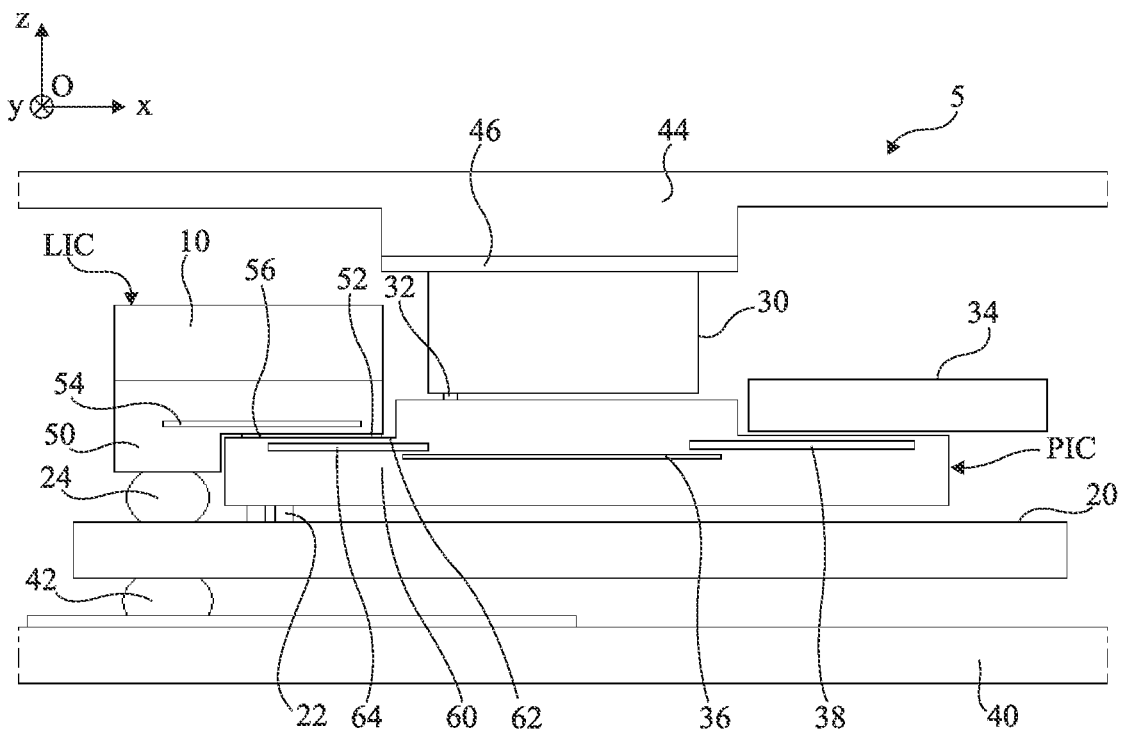
FIG. 1 is a partial and schematic lateral sectional view of an embodiment of a photonic system.
Figure 2:
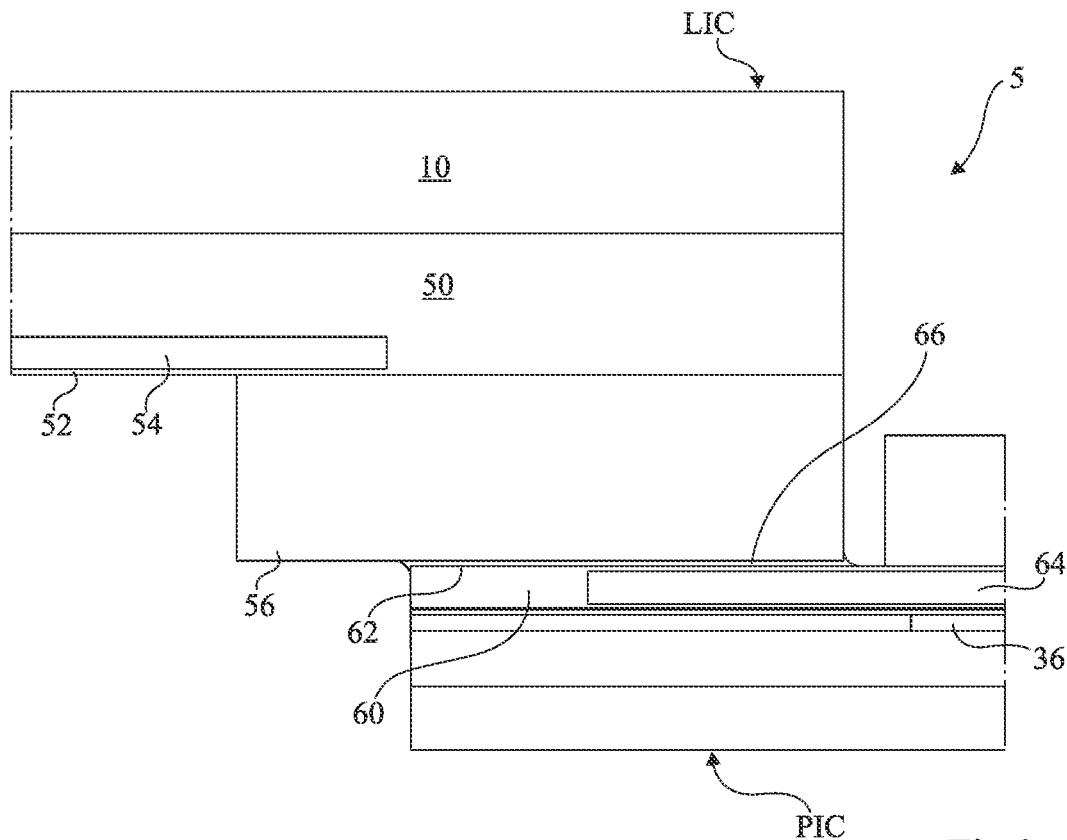
FIG. 2 is an enlarged sectional view of a part of the photonic system shown in FIG. 1.

FIG. 1 illustrates an embodiment of a photonic system 5. FIG. 2 is an enlarged view of a part of FIG. 1. The photonic system 5 comprises a photonic emitter circuit LIC comprising an optical signal generator 10 for generating at least two optical signals. According to an embodiment, the optical signal generator 10 comprises at least two light sources. According to an embodiment, each light source is a laser source. The optical signal generator 10 of the photonic emitter circuit LIC can be realized, at least partly, using a III-V compound, i.e., a compound containing predominantly at least one group III element and one group V element, for example indium phosphide (InP). The optical signal generator 10 can, moreover, be implemented using a silicon on insulator (SOI) substrate.

The photonic system 5 comprises at least one photonic processing circuit PIC that makes it possible to carry out the operations of transmission, processing and/or conversion of the optical signals emitted by the photonic emitter circuit LIC. The photonic emitter circuit LIC is optically coupled with the photonic processing circuit PIC.

According to an embodiment, the photonic processing circuit PIC is fixed to a support 20, for example by way of connection elements 22, for example copper pins. In the present embodiment, the photonic emitter circuit LIC is also fixed to the support 20, for example by way of at least one bonding ball 24. The bonding ball 24 simultaneously plays the rolls of mechanical connection element and electrical connection element between the photonic emitter circuit LIC and the support 20.

The photonic system 5 can further comprise at least one integrated circuit 30, for example an ASIC (application-specific integrated circuit), which can be fixed to the photonic processing circuit PIC or to the support 20, for example by way of connection elements 32, in particular copper pins. The photonic system 5 can further comprise a linking module 34, for example made of a polymer, fixed to the photonic processing circuit PIC. The linking module 34 includes wave guides and makes it possible, for example, to link the photonic system 5 to optical fibers, not illustrated. The photonic processing circuit PIC comprises in particular wave guides 36, 38 for the transmission of optical signals between the different elements of the photonic system 5, in particular between the photonic emitter circuit LIC and the linking module 34.

The support 20 can be fastened to a printed circuit board 40 by connection elements, for example bonding balls 42. The photonic system 5 can further comprise a housing 44, partially illustrated in FIG. 1, which encapsulates the different circuits described in the foregoing. The housing 44 can further comprise a heat sink 46, for example linked to the integrated circuit 30. The support 20 can further comprise conductive and traversing vias that make it possible to supply the photonic emitter circuit LIC electrically by way of the bonding balls 24, 42 and further capable of, together with the bonding balls 24, 42, playing the role of a heat sink for the photonic emitter circuit LIC.

According to an embodiment, the optical coupling between the photonic emitter circuit LIC and the photonic processing circuit PIC is an adiabatic coupling, or at least partially adiabatic. The photonic emitter circuit LIC comprises at least one layer 50 delimiting a lower face 52. The lower face 52 is preferably plane. An orthogonal system of coordinates (Oxyz) is defined, the axis (Oz) extending perpendicularly to the face 52 and the plane (Oxy) being parallel to the face 52.

The photonic processing circuit LIC comprises, for each optical signal to be transmitted from the photonic emitter circuit LIC to the photonic processing circuit PIC, a wave guide 54 that extends at least partly in the layer 50 close to the lower face 52. According to an embodiment, each wave guide 54 has at least one rectilinear part extending in the direction (Ox). According to an embodiment, the layer 50 is made of a first inorganic dielectric material, for example of an oxide, in particular silicon oxide, having a first refractive index, and the wave guide 54 is made of a second inorganic dielectric material, for example of silicon (Si), of silicon nitride (SiN) or of indium phosphide (InP), having a second refractive index that is higher than the first refractive index.

The photonic emitter circuit LIC further comprises, for each wave guide 54, a wave guide 56 which extends over the face 52 and which at least partially covers, viewed in the direction (Oz), the wave guide 54. Each wave guide 56 can be made of a polymer, for example of an inorganic material of the type hydrogen silsesquioxane (HSQ) or a conventional organic material used in optical telecommunications modules.

The photonic processing circuit PIC comprises at least one layer 60 delimiting an upper face 62 of the photonic processing circuit PIC. The upper face 62 is preferably plane. The photonic processing circuit PIC comprises, for each wave guide 56, a wave guide 64 which extends at least partly in the layer 60 close to the upper face 62 and which partly covers, viewed in the direction (Oz), the wave guide 56. According to an embodiment, the layer 60 is made of a third inorganic dielectric material, which can correspond to the first inorganic dielectric material described in the foregoing, for example an oxide, in particular silicon oxide, having a third refractive index, and the wave guide 64 is made of a fourth inorganic dielectric material, which can correspond to the second inorganic dielectric material described in the foregoing, for example Si, SiN or SiON, having a fourth refractive index that is higher than the third refractive index. According to an embodiment, the wave guides 54, the wave guides 56 and the wave guides 64 extend in substantially parallel directions.

The refractive index of the material forming the wave guides 56 is intermediate between the refractive index of the second material forming the wave guides 54 and the refractive index of the fourth material forming the wave guides 64.

A gluing material 66, not illustrated in FIG. 1, can be deposited between the photonic processing circuit PIC and the wave guides 56. The maximum thickness of the gluing material 66 between the photonic processing circuit PIC and the wave guides 56, measured in the direction (Oz), is preferably less than 2 μm. The gluing material 66 can in particular play the role of a protective layer against humidity. The gluing material 66 can be implemented in liquid form, and the hardening of the gluing material 66 can result from a chemical reaction within the same. When the fixation of the photonic emitter circuit LIC to the photonic processing circuit PIC uses bonding balls 24, the gluing material 66 is preferably chosen so that its hardening occurs after the step of melting the bonding balls 24.

Figure 3:
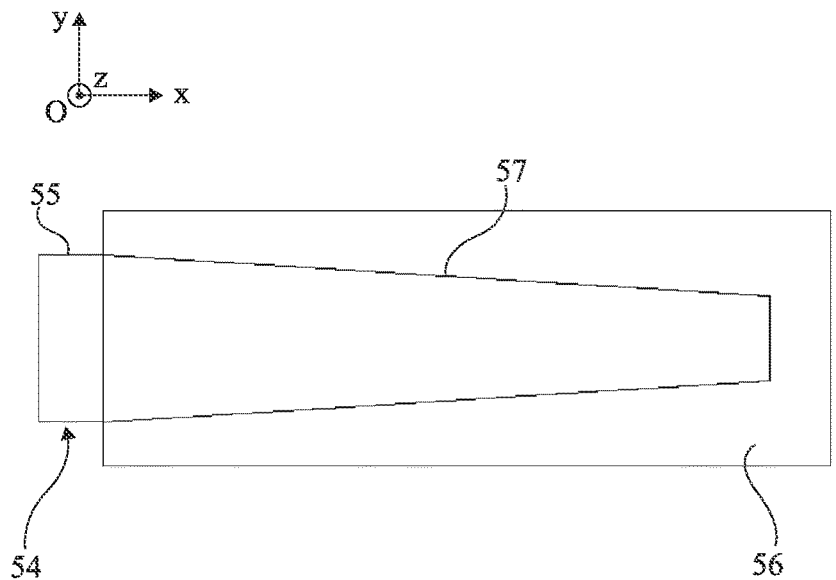
FIG. 3 is a top view illustrating a zone of overlap between two wave guides.

FIG. 3 is a partial and schematic view in the direction (Ox) illustrating the zone of overlap between one of the wave guides 54 and the corresponding wave guide 56. According to an embodiment, each wave guide 54 comprises a portion 55 with a rectangular-shaped constant cross-section that is prolonged by a pointed portion 57 with a rectangular-shaped cross-section the area of which decreases. The pointed portion 57 covers the wave guide 56. According to an embodiment, the width of the cross-section of the wave guide 54, measured in the direction (Oy), can vary from 50 nm to 250 nm, for example 100 nm, within the pointed portion 57 and the height, measured in the direction (Oz), can vary from 75 nm to 750 nm. According to an embodiment, each wave guide 56 has a rectangular cross-section with constant dimensions the width of which, measured parallel to the lower face 52 in the direction (Oy), can vary from 5 μm to 10 μm, and the height of which, measured perpendicularly to the lower face 52 in the direction (Oz), can vary from 5 μm to 10 μm, for example approximately 6 μm. The thickness, measured in the direction (Oz), of the portion of the layer 50 deposited between each wave guide 54 and the corresponding wave guide 56 can vary from 50 nm to 500 nm. This thickness depends in particular on the materials forming the layer 50 and the wave guides 54, 56 and on the dimensions of the wave guides 54, 56. The distance between adjacent wave guides is comprised between 10 μm and 100 μm.

Figure 4:
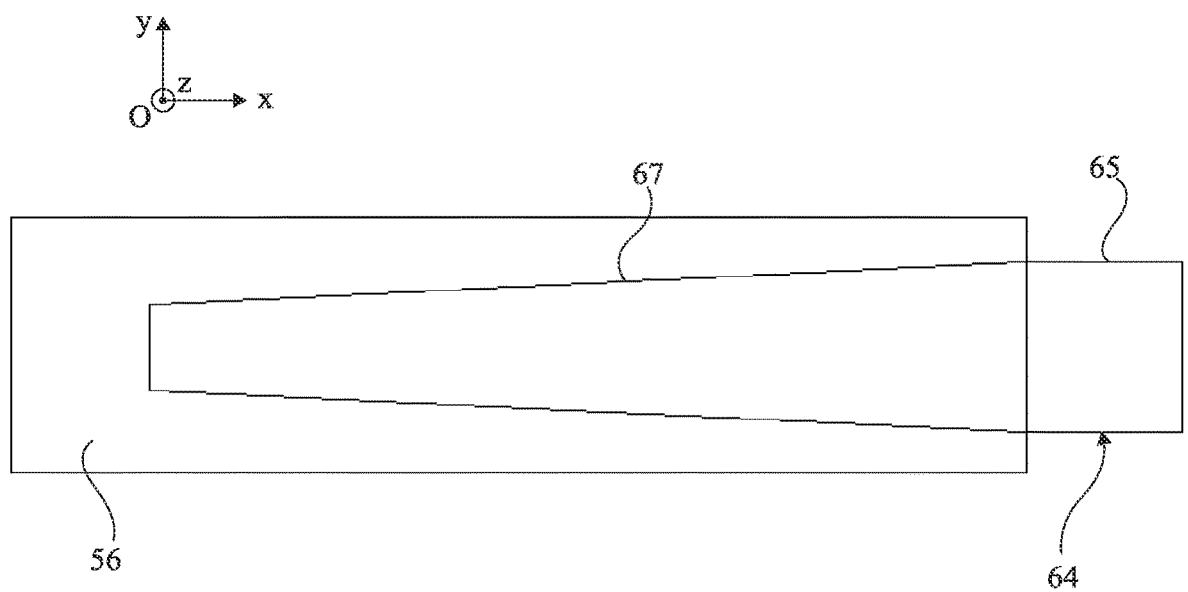
FIG. 4 is a top view illustrating a zone of overlap between two wave guides.

FIG. 4 is a partial and schematic view in the direction (Ox) illustrating the zone of overlap between one of the wave guides 64 and the corresponding wave guide 56. According to an embodiment, each wave guide 64 comprises a portion 65 with a rectangular-shaped constant cross-section prolonged by a pointed portion 67 with a rectangular-shaped cross-section the area of which decreases. The wave guide 56 covers the pointed portion 67. According to an embodiment, the width of the cross-section of the wave guide 64, measured in the direction (Oy), can vary from 50 nm to 250 nm, for example 100 nm, within the zone of adiabatic coupling and the height, measured in the direction (Oz), can vary from 75 nm to 750 nm, for example approximately 600 nm. The thickness, measured in the direction (Oz), of the portion of the layer 60 deposited between each wave guide 64 and the corresponding wave guide 56 can vary from 25 nm to 100 nm. This thickness depends in particular on the materials forming the layer 60 and the wave guides 64, 56 and on the dimensions of the wave guides 64, 66. The distance between two adjacent wave guides 64 is comprised between 10 μm and 100 μm.

Figure 5:
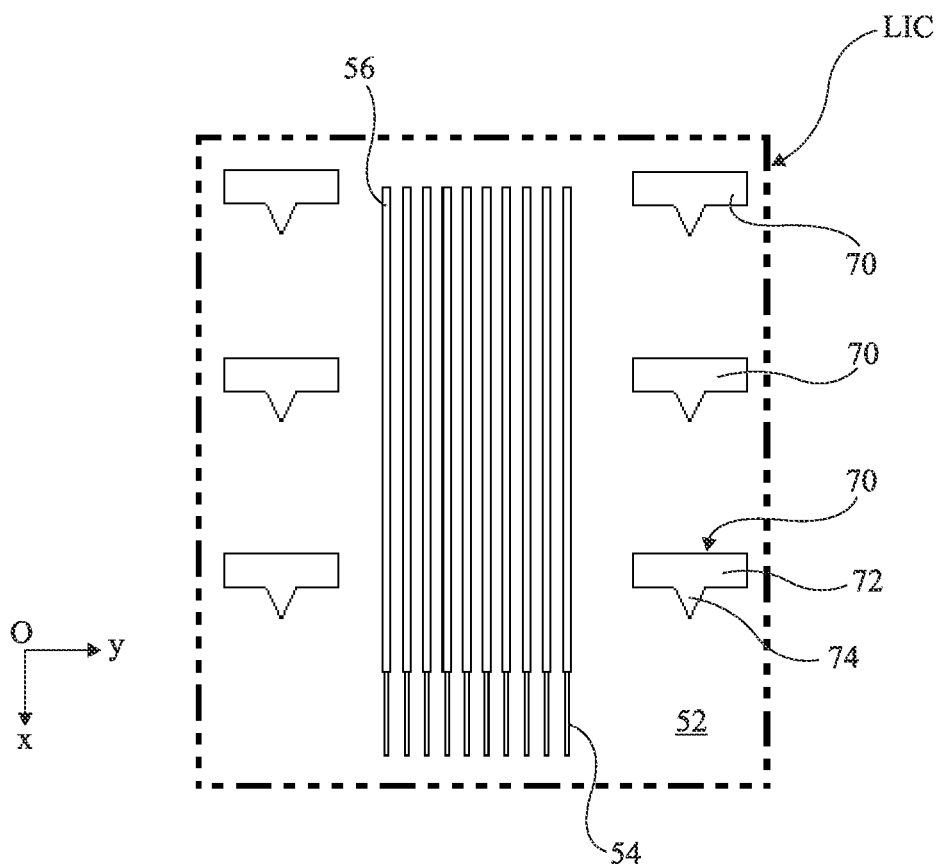
FIG. 5 is a partial and schematic bottom view of a photonic emitter circuit of the photonic system illustrated in FIGS. 1 and 2.

FIG. 5 is a bottom view of a part of the photonic emitter circuit LIC. Illustrated in this figure, as an example, are ten wave guides 56 and partially the ten associated wave guides 54. Each wave guide 56 covers a part of the associated wave guide 54. Preferably, each wave guide 56 is rectilinear and extends in the direction (Ox) and each wave guide 54 comprises a rectilinear part extending in the direction (Ox). The length of each wave guide 56 in the direction (Ox) can vary from 2 mm to 6 mm. The length of overlap in the direction (Ox) between each wave guide 56 and the associated wave guide 54 can vary from 1 mm to 3 mm.

The photonic emitter circuit LIC further comprises first positioning devices 70 lying on the face 52. According to an embodiment, the first positioning devices 70 can be made of the same material as the wave guides 56. Preferably, the first positioning devices 70 are formed simultaneously with the wave guides 56. According to an embodiment, the height of each first positioning device 70, measured in the direction (Oz), is less than or equal to, preferably equal to, the height of each wave guide 56 measured in the direction (Oz). Preferably, the first positioning devices 70 have identical shapes.

Figure 6:
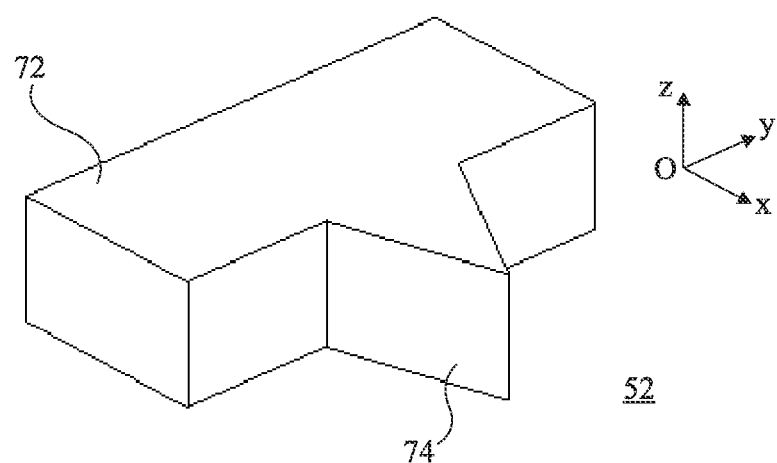
FIG. 6 is a perspective view of an embodiment of a first positioning device.

FIG. 6 is a perspective view of an embodiment of a first positioning device 70. According to an embodiment, the first positioning device 70 comprises a body 72 and a protruding portion 74 that protrudes in relation to the body 72 in the direction (Ox). According to an embodiment, the cross-section of the protruding portion 74 in the direction (Oz) is substantially constant and has a pointed shape, for example triangular. The dimensions of the body 72 are provided in order to ensure a suitable fixation of the first positioning device 70 to the face 52. According to an embodiment, the cross-section of the body 72 in a plane perpendicular to the direction (Ox) corresponds to a rectangle the long side of which is comprised between 100 μm and 1 mm.

Figure 7:
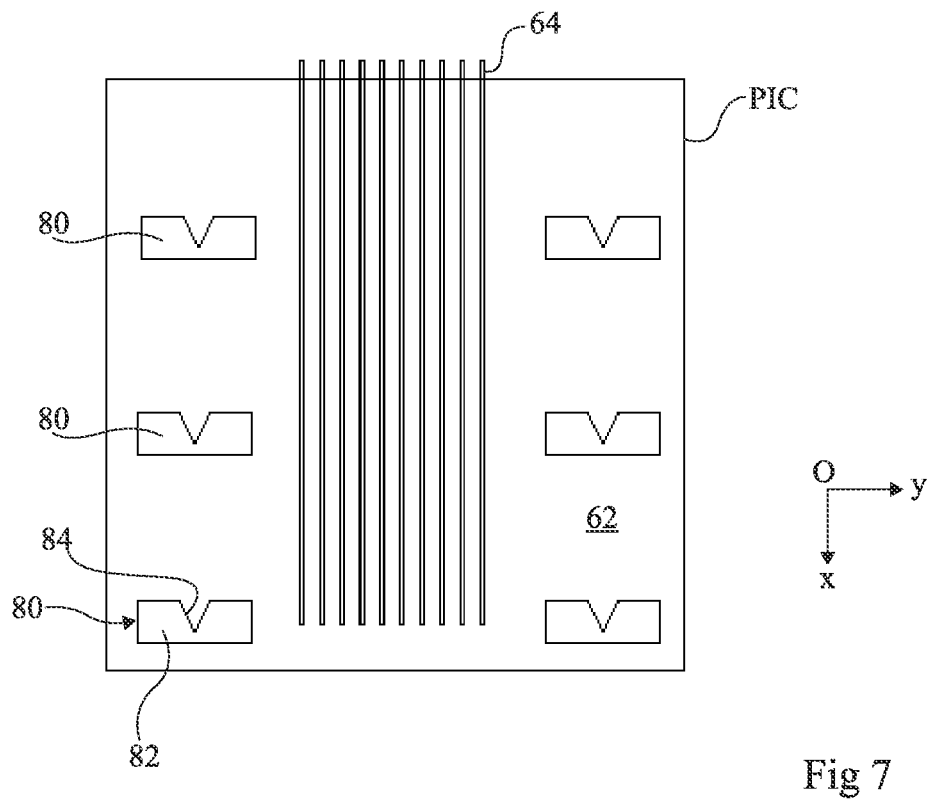
FIG. 7 is a partial and schematic bottom view of a photonic processing circuit of the photonic system illustrated in FIGS. 1 and 2.

FIG. 7 is a top view of a part of the photonic processing circuit PIC. Illustrated in this figure, as an example, are ten wave guides 64. Each wave guide 56, not illustrated in FIG. 7, covers a part of the associated wave guide 64. Preferably, each wave guide 64 comprises at least one rectilinear part extending in the direction (Ox). According to an embodiment, the length of the zone of overlap between the wave guide 56 and the associated wave guide 64 can vary from 1 mm to 3 mm.

The photonic processing circuit PIC further comprises second positioning devices 80 lying on the upper face 62. According to an embodiment, the second positioning devices 80 can be made of the same material as the first positioning devices or of a different material than the first positioning devices. According to an embodiment, the height of each first positioning device 80, measured in the direction (Oz), is less than or equal to, preferably equal to, the height of each wave guide 56 measured in the direction (Oz). Preferably, the second positioning devices 80 have identical shapes. The number of second positioning devices 80 is equal to the number of first positioning devices 70. According to an embodiment, the number of first positioning devices 70 can vary from 2 to 6 depending on the dimensions of the positioning devices 70.

Figure 8:
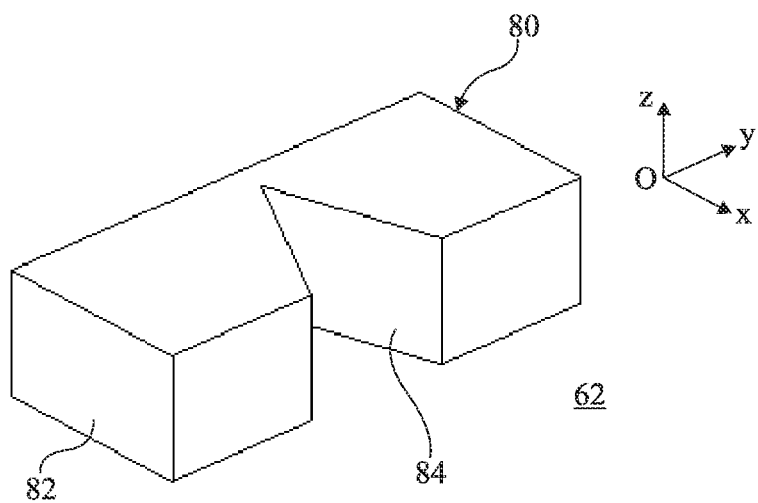
FIG. 8 is a perspective view of an embodiment of a second positioning device.

FIG. 8 is a perspective view of an embodiment of a second positioning device 80. According to an embodiment, the second positioning device 80 comprises a body 82 and a hollow portion 84 that sections the body 82. According to an embodiment, the hollow portion 84 of the second positioning device 80 has a shape at least partially complementary to the protruding portion 74 of the first positioning device 70. According to an embodiment, the cross-section of the hollow portion 84 in the direction (Oz) has a "V" shape, and corresponds for example to a triangle, as illustrated in FIG. 8. The dimensions of the body 82 are provided in order to ensure a suitable fixation of the second positioning device 80 to the face 62. According to an embodiment, the cross-section of the body 82 in the direction (Ox) corresponds to a rectangle the long side of which is comprised between 100 μm and 1 mm.

Figure 9:
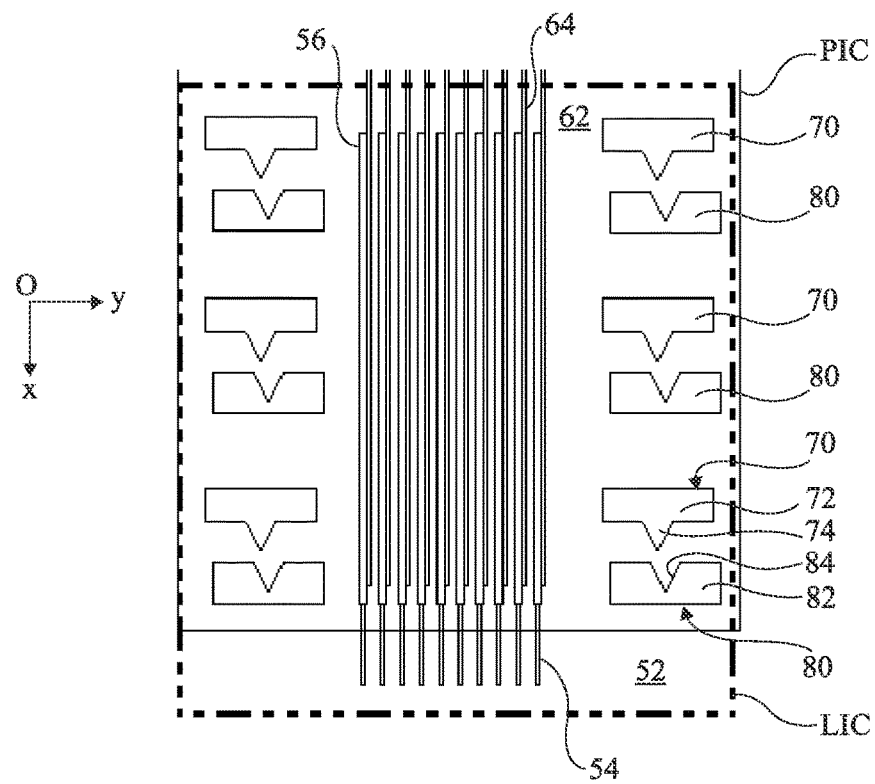
FIG. 9 is a partial and schematic sectional top view of the photonic emitter circuit illustrated in FIG. 5 and of the photonic processing circuit illustrated in FIG. 7 at a step of an embodiment of a method for mounting the photonic emitter circuit on the photonic processing circuit.
Figure 10:
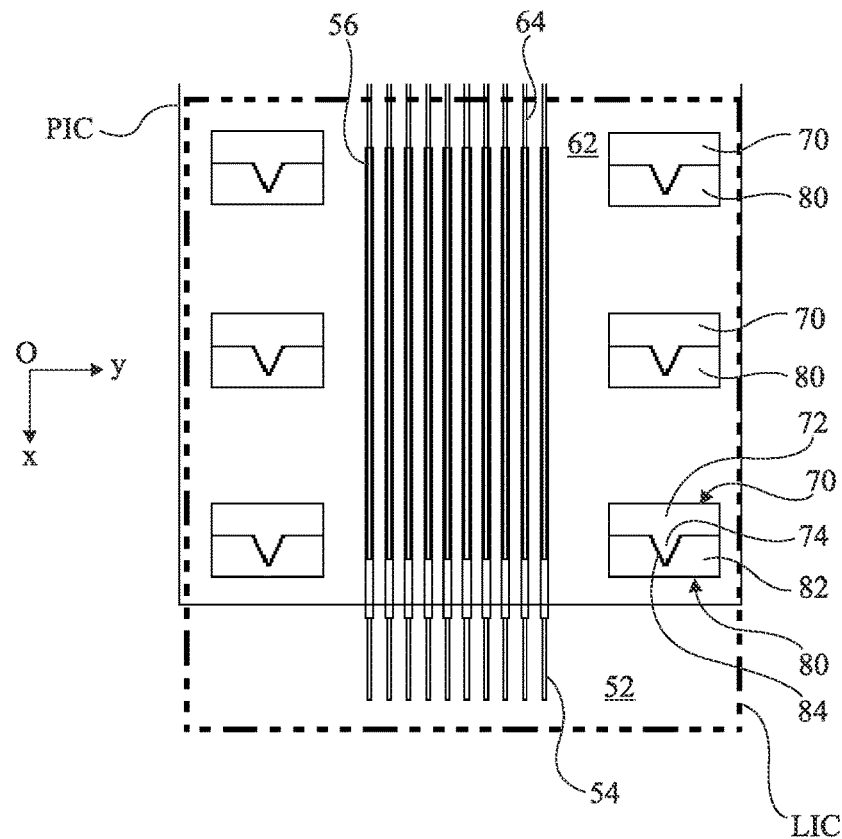
FIG. 10 is a partial and schematic sectional top view of the photonic emitter circuit illustrated in FIG. 5 and of the photonic processing circuit illustrated in FIG. 7 at a step of an embodiment of a method for mounting the photonic emitter circuit on the photonic processing circuit.

FIGS. 9 and 10 illustrate the method for fixing the photonic emitter circuit LIC to the photonic processing circuit PIC. For the purposes of illustration, the photonic emitter circuit LIC and the photonic processing circuit PIC are schematically illustrated in a top view and superimposed.

FIG. 9 illustrates the structure obtained when the photonic emitter circuit LIC is brought close to the photonic processing circuit PIC, the lower face 52 of the photonic emitter circuit LIC at least partially covering the upper face 62 of the photonic processing circuit PIC, with the gluing material 66, not illustrated, being present on the PIC side. In this step, the positioning of the photonic emitter circuit LIC with respect to the photonic processing circuit PIC is such that each first positioning device 70 is located across from one of the positioning devices 80. In this step, the restrictions pertaining to the alignment of the wave guides 56 with respect to the wave guides 64 are reduced.

FIG. 10 illustrates the structure obtained after having moved the photonic emitter circuit LIC with respect to the photonic processing circuit PIC in the direction (Ox) until the protruding portion 74 of each first positioning device 70 penetrates the hollow portion 84 of the associated second positioning device 80. By continuing the movement of the photonic emitter circuit LIC with respect to the photonic processing circuit PIC in the direction (Ox), the protruding portion 74 of each first positioning device 70 cooperates with the hollow portion 84 of the second positioning device 80, which can further cause a relative movement of the photonic emitter circuit LIC with respect to the photonic processing circuit PIC in the direction (Oy) until each first positioning device 70 abuts the associated second positioning device 80. A precise positioning of the photonic emitter circuit LIC with respect to the photonic processing circuit PIC is achieved automatically in the directions (Ox) and (Oy).

According to an embodiment, the positioning of the photonic emitter circuit LIC with respect to the photonic processing circuit PIC in the direction (Oz) is achieved by supporting the photonic emitter circuit LIC against the photonic processing circuit PIC, the wave guides 56 of the photonic emitter circuit LIC coming into contact with the upper face 62 of the photonic processing circuit PIC. Bonding balls 24 can be used for the mechanical and electrical linkage between the photonic emitter circuit LIC and the support 20. The fixation of the photonic emitter circuit LIC to the photonic processing circuit PIC thus comprises a step of melting the bonding balls 24 during which the bonding balls 24 deform. Before the melting step, the dimensions of the bonding balls 24 may not permit the supporting of the photonic emitter circuit LIC against the photonic processing circuit PIC. According to an embodiment, the heights, measured in the direction (Oz), of the first positioning devices 70 and of the associated second positioning devices 80 are such that, before the step of melting the bonding balls, the first positioning devices 70 can cooperate with the second positioning devices 80. The positioning of the photonic emitter circuit LIC with respect to the photonic processing circuit PIC in the directions (Ox) and (Oy) can thus be achieved. During melting, under the weight of the photonic emitter circuit LIC, the bonding balls 24 can deform so that the photonic emitter circuit LIC moves in the direction (Oz) with respect to the photonic processing circuit PIC until the photonic emitter circuit LIC is supported against the photonic processing circuit PIC. The positioning of the photonic emitter circuit LIC with respect to the photonic processing circuit PIC in the direction (Oz) is thus achieved.

An advantage of the embodiments described in the foregoing is that a suitable alignment between the photonic emitter circuit LIC and the photonic processing circuit PIC is achieved automatically, in a passive manner, during the mounting of the photonic emitter circuit LIC on the photonic processing circuit PIC. Thus, by means of the implemented adiabatic coupling mechanism, as opposed to an edge or surface coupling mechanism, the coupling between the photonic emitter circuit LIC and the photonic processing circuit PIC exhibits low optical losses. Moreover, the congestion of the zone of optical coupling is reduced inasmuch as a plurality of optical signals are coupled simultaneously between the photonic emitter circuit LIC and the photonic processing circuit PIC.

Various embodiments and variants have been described. Those skilled in the art will understand that certain features of these embodiments can be combined and other variants will readily occur to those skilled in the art. In particular, although several embodiments have been described for optical coupling between the photonic emitter circuit and the photonic processing circuit PIC, it is clear that these embodiments can be implemented so as to realize an optical coupling between any type of photonic circuit, for example between two photonic processing circuits. Moreover, although the first positioning devices 70 having the protruding portions 74 are illustrated in the embodiments described in the foregoing as formed on the photonic emitter circuit LIC and the second positioning devices 80 having the hollow portions 84 are illustrated as formed on the photonic processing circuit PIC, it is clear that an inverse arrangement can be provided, i.e., that the first positioning devices 70 having the protruding portions 74 are formed on the photonic processing circuit PIC and the second positioning devices 80 having the hollow portions 84 are formed on the photonic emitter circuit LIC. Moreover, although embodiments have been described in which the protruding portion 74 of the first positioning device 70 has a triangular cross-section and the hollow portion 84 of the second positioning device 80 has a triangular cross-section, it is clear that the protruding portion 74 and the hollow portion 84 can have different shapes as long as these portions permit an automatic centering of the protruding portion 74 with respect to the hollow portion 84 in the direction (Oy) when the protruding portion 74 penetrates the hollow portion 84 in the direction (Ox) and permit a blocking of the portion in relief 74 with respect to the hollow portion 84 in the directions (Ox) and (Oy) when the protruding portion 74 has penetrated the hollow portion 84 to a sufficient extent. For instance, the hollow portion 84 and the protruding portion 74 can each have a cross-section in the form of a "V" with curved arms, for example in the form of arcs of a circle.

Finally, the practical implementation of the embodiments and variants described herein is within the capabilities of those skilled in the art based on the functional description provided hereinabove.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A photonic system, comprising:
a first photonic circuit having a first dielectric layer with a first face, first wave guides extending along a first direction, second wave guides extending along the first direction in the first dielectric layer, and first positioning devices projecting outwardly from the first face, the first wave guides being in contact with the first face;
a second photonic circuit having a second dielectric layer with a second face, third wave guides extending along the first direction in the second dielectric layer, and second positioning devices projecting outwardly from the second face, each third wave guide at least partly covering and being coupled to a corresponding one of the first wave guides, the first wave guides being positioned between the first face and the second face and at least one of the first positioning devices abutting a corresponding one of the second positioning devices in the first direction that is transverse to a second direction in which the first and second positioning devices project outwardly from the first and second faces, respectively,
wherein the first wave guides and the first positioning devices are made of a same material composition.

2. The system of claim 1 wherein the first positioning devices include a first main body and a protruding portion.

3. The system of claim 2 wherein the second positioning devices include a second main body having an indentation.

4. The system of claim 3 wherein the protruding portion is triangular.

5. The system of claim 4 wherein the indentation is triangular.

6. A system, comprising:
a first photonic circuit that includes:
a first surface opposite to a second surface;
a first wave guide of a first material;
a first protruding positioning device on the first surface, the first protruding positioning device including a triangular protrusion and a first rectangular portion, the first protruding positioning device of the first material;
a second photonic circuit that includes:
a first surface opposite to a second surface;
a second wave guide;
a first indented positioning device on the first surface, the first protruding positioning device configured to be received by the first indented positioning device.

7. The system of claim 6 wherein the first indented positioning device includes a triangular indentation and a second rectangular portion, the triangular indentation being centered on the second rectangular portion.

8. The system of claim 6 wherein the first photonic circuit includes a second protruding positioning device and the second photonic circuit includes a second indented positioning device.

9. The system of claim 8 wherein the second protruding positioning device is configured to be received by the second indented positioning device.

10. A system, comprising:
a first photonic circuit having a first surface opposite to a second surface;
a first waveguide made of a first material on the first surface of the first photonic circuit;
a second photonic circuit having a third surface opposite to a fourth surface;
a second waveguide on the third surface of the second photonic circuit;
a plurality of first positioning devices made of the first material on the first surface of the first photonic circuit, the plurality of first positioning devices including a protrusion and a rectangular portion; and
a plurality of second positioning devices on the third surface of the second photonic circuit, the plurality of second positioning devices including an indentation.

11. The system of claim 10 wherein the plurality of first positioning devices are configured to be received by the plurality of second positioning devices.

12. The system of claim 10 wherein a number of the plurality of first positioning devices is the same as a number of the plurality of second positioning devices.

13. The system of claim 10 wherein the protrusion is triangular.

14. The system of claim 13 wherein the indentation is triangular.

15. The system of claim 10 wherein the first waveguide overlaps the second waveguide.

16. The system of claim 15 wherein the first waveguide includes a plurality of rectangular prolonged portions with a tapered pointed end.

17. The system of claim 16 wherein the first and second waveguides are surrounded by the plurality of first positioning devices.

* * * * *